United States Patent
Kho et al.

(10) Patent No.: US 8,441,477 B2
(45) Date of Patent: May 14, 2013

(54) APPARATUS AND METHOD OF ENHANCING RAY TRACING SPEED

(75) Inventors: Young Ihn Kho, Seoul (KR); Min Su Ahn, Seoul (KR)

(73) Assignee: Samsung Electronis Co., Ltd., Suwon-Si (KR)

( * ) Notice: Subject to any disclaimer, the term of this patent is extended or adjusted under 35 U.S.C. 154(b) by 589 days.

(21) Appl. No.: 12/453,999

(22) Filed: May 28, 2009

(65) Prior Publication Data

US 2010/0164948 A1    Jul. 1, 2010

(30) Foreign Application Priority Data

Dec. 29, 2008  (KR) .......................... 10-2008-0135350

(51) Int. Cl.
*G06T 15/00*    (2006.01)

(52) U.S. Cl.
USPC .......................................................... 345/419

(58) Field of Classification Search .................. None
See application file for complete search history.

(56) References Cited

U.S. PATENT DOCUMENTS

| | | | |
|---|---|---|---|
| 6,556,200 B1 * | 4/2003 | Pfister et al. | 345/426 |
| 7,012,604 B1 * | 3/2006 | Christie et al. | 345/426 |

FOREIGN PATENT DOCUMENTS

| | | |
|---|---|---|
| KR | 10-2001-0113730 | 12/2001 |
| KR | 10-2003-0068445 | 8/2003 |
| KR | 10-0791411 | 12/2007 |
| KR | 10-2008-0061505 | 7/2008 |

OTHER PUBLICATIONS

Wald et al (Ray Tracing Animated Scenes using Coherent Grid Traversal, ACM, 2006).*
Watt et al (Advanced Animation and Rendering Techniques: Theory and Practice, ACM press, 1992).*
Reshetov et al (Multi-Level Ray Tracing Algorithm, ACM, 2005).*

* cited by examiner

*Primary Examiner* — Ke Xiao
*Assistant Examiner* — Kyle Zhai
(74) *Attorney, Agent, or Firm* — Staas & Halsey LLP

(57) ABSTRACT

A method and an apparatus of enhancing a ray tracing speed. The method of enhancing a ray tracing speed may group a secondary ray based on a direction of the secondary ray in a 3D space, and may perform packet tracing based on the grouped secondary ray.

16 Claims, 9 Drawing Sheets

APPARATUS AND METHOD OF ENHANCING RAY TRACING SPEED

CROSS-REFERENCE TO RELATED APPLICATIONS

This application claims the benefit of Korean Patent Application No. 10-2008-0135350, filed on Dec. 29, 2008, in the Korean Intellectual Property Office, the disclosure of which is incorporated herein by reference.

BACKGROUND

1. Field

Example embodiments relate to a method of enhancing a ray tracing speed, and more particularly, to a method of enhancing a ray tracing speed by regrouping into a group a secondary ray based on a direction of the secondary ray, and performing a packet tracing based on the group.

2. Description of the Related Art

A three-dimensional (3D) image processing technology is a technology that generates a scene similar to an actual image, on a plane display such as a TV, a monitor, etc. The 3D image processing sets a virtual stereoscopic space Where a virtual stereoscopic object is to be placed, and simulates an image that may be viewed from a viewpoint of an observer according to a relation between a virtual light source and the virtual stereoscopic object.

The 3D image processing is classified into a process of modeling the virtual stereoscopic space and the virtual stereoscopic object, and a process of extracting an image of a modeled virtual stereoscopic object that is projected according to a viewpoint of an observer. The process of extracting the image of the virtual stereoscopic object that is projected according to the viewpoint of the observer is referred to as 3D rendering.

Ray tracing is one method of 3D rendering, which calculates an object seen by emitting, from a viewpoint, a ray to a virtual 3D space in a direction of each pixel on the image and calculates illuminance of the object. In this instance, a method of processing a common traversal only once by grouping rays having similar directions is suggested, which is referred to as a packet tracing method.

However, a conventional packet tracing method has a high efficiency only with respect to a primary ray that has a high coherency.

Accordingly, there is need for continuous studies for enhancing an efficiency of the ray tracing by grouping a secondary ray to have high coherency.

SUMMARY

According to example embodiments, there may be provided a method of enhancing a ray tracing speed, the method including performing ray tracing with respect to a primary ray, storing a secondary ray generated corresponding to the ray tracing, grouping the secondary ray based on a direction of the secondary ray, and performing packet tracing with respect to the secondary ray for each group.

In this instance, the grouping of the secondary ray may include determining a horizontal angle of the secondary ray, determining a vertical angle of the secondary ray, mapping, based on the horizontal angle and the vertical angle, the secondary ray to a two-dimensional (2D) plane that is divided into a plurality of grids, and grouping the secondary ray based on the grids.

Also, the grouping based on the grids may perform grouping of rays in a single grid into a single group, when a number of the rays in the single grid is greater than or equal to a predetermined number, and may not perform the grouping of the rays in the single grid, when the number of the rays in the single grid is less than the predetermined number.

According to example embodiments, there may be provided an apparatus of enhancing a ray tracing, the apparatus including a first ray tracing unit to perform ray tracing with respect to a primary ray, a secondary ray storage unit to store a secondary ray generated corresponding to the ray tracing, a grouping unit to perform grouping of the secondary ray based on a direction of the secondary ray, and a second ray tracing unit to perform a packet tracing with respect to the secondary ray for each generated group.

Also, the grouping unit includes a horizontal angle determining unit to determine a horizontal angle of the secondary ray, a vertical angle determining unit to determine a vertical angle of the secondary ray, a 2D mapping unit to perform mapping of the secondary ray to a 2D plane that is divided into a plurality of grids, based on the horizontal angle and the vertical angle, and a group setting unit to perform grouping of the secondary ray based on the grids.

Additional aspects of example embodiments will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the example embodiments, taken in conjunction with the accompanying drawings of which.

DETAILED DESCRIPTION

Figure 1:
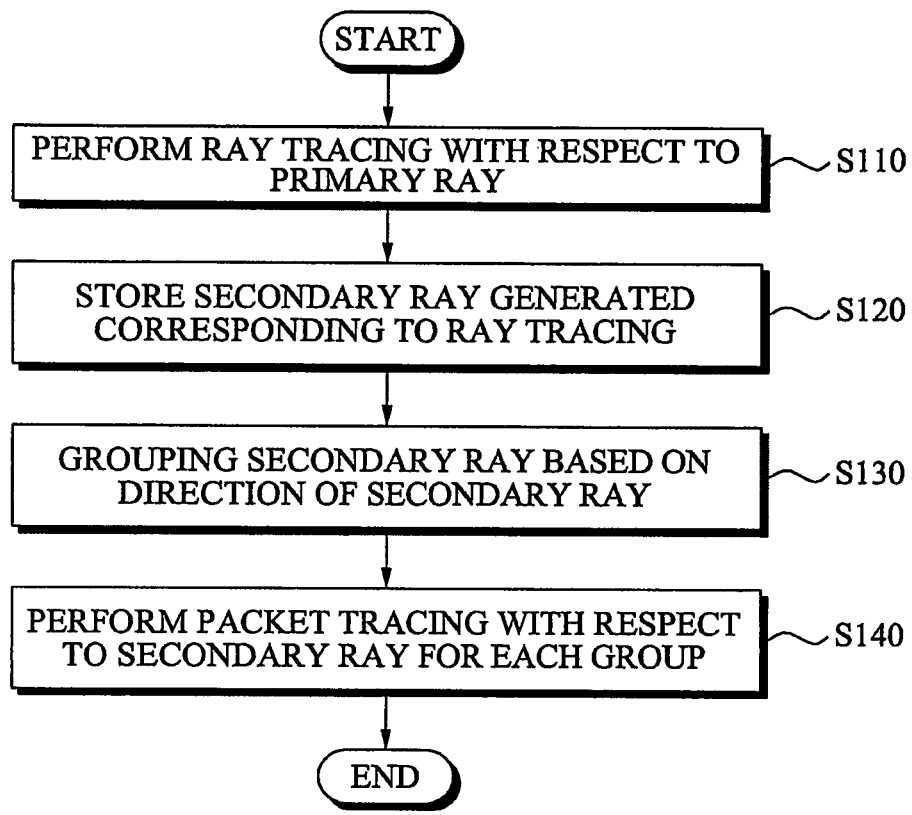
FIG. 1 illustrates a flowchart of a method of enhancing a ray tracing speed according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a flowchart of a method of enhancing a ray tracing speed according to example embodiments.

Referring to FIG. 1, ray tracing with respect to a primary ray is performed in operation S110. In this instance, the ray tracing may be performed by emitting the primary ray to an entire scene. If a traversal is performed with respect to rays having similar directions during the ray tracing, a traversal portion that the two rays commonly share may be processed at once, and thus, efficiency of the ray tracing may be improved. The traversal of the rays having similar directions will be described in detail with reference to FIG. 5.

Figure 5:
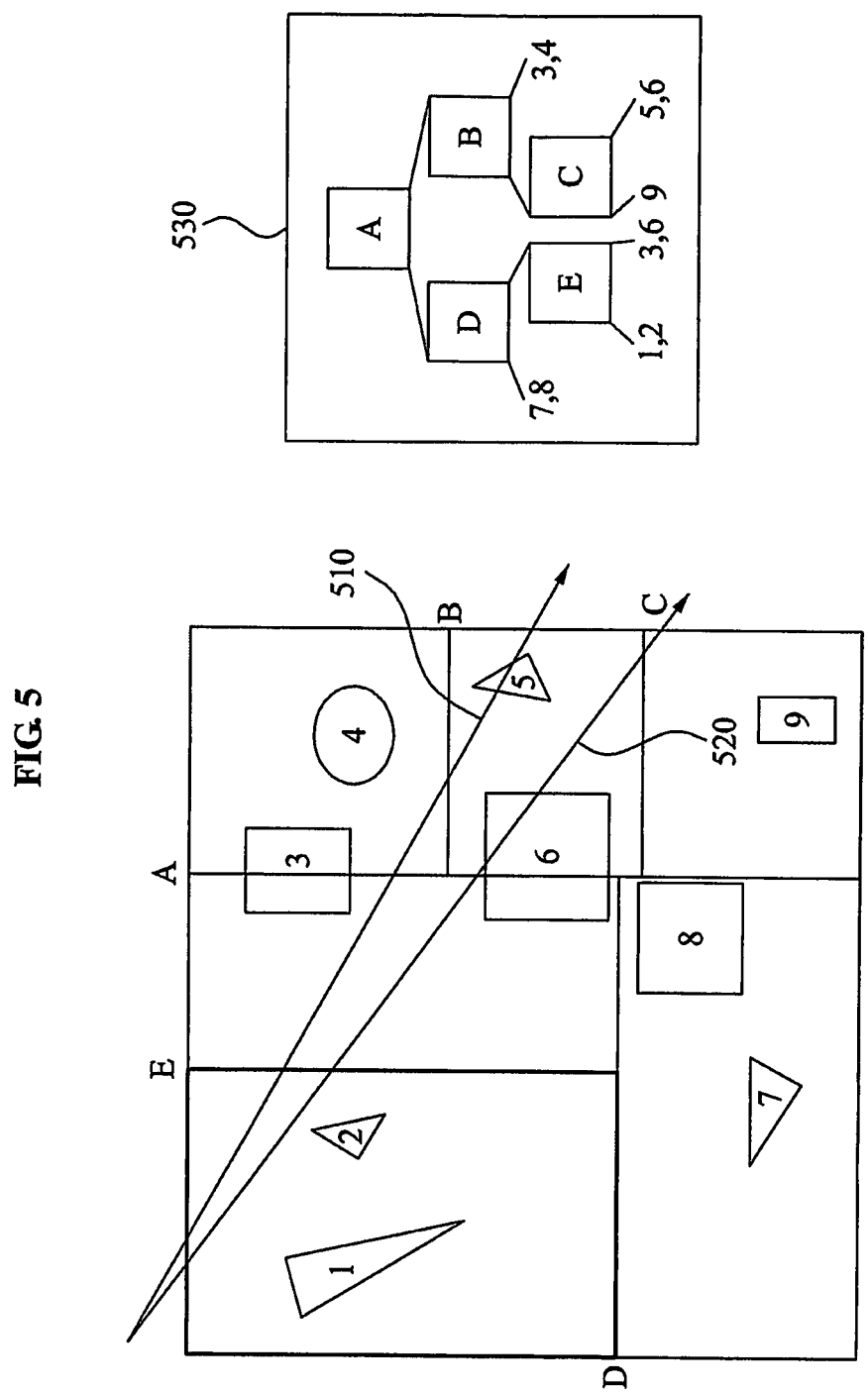
FIG. 5 illustrates a diagram of a traversal of similar rays in a method of enhancing a ray tracing speed according to other example embodiments.

Referring to FIG. 5, a first ray 510 and a second ray 520 may have the same traversal sequence. That is, since the traversal sequence of the first ray 510 and the second ray 520 via a k-dimensional tree (kd-tree) 530 is the same, a common operation may be processed at once, the sequence being A, D, E, (1, 2), (3, 6), B, C and (6, 5).

Referring again to FIG. 1, a secondary ray generated corresponding to the ray tracing may be stored in operation S120. That is, the secondary ray generated corresponding to a tracing of the primary ray may be stored to perform grouping rays based on rays having similar directions with respect to the secondary ray S130. The secondary ray generated corresponding to the tracing of the primary ray will be described in detail with reference to FIG. 3 and FIG. 4.

Figure 3:
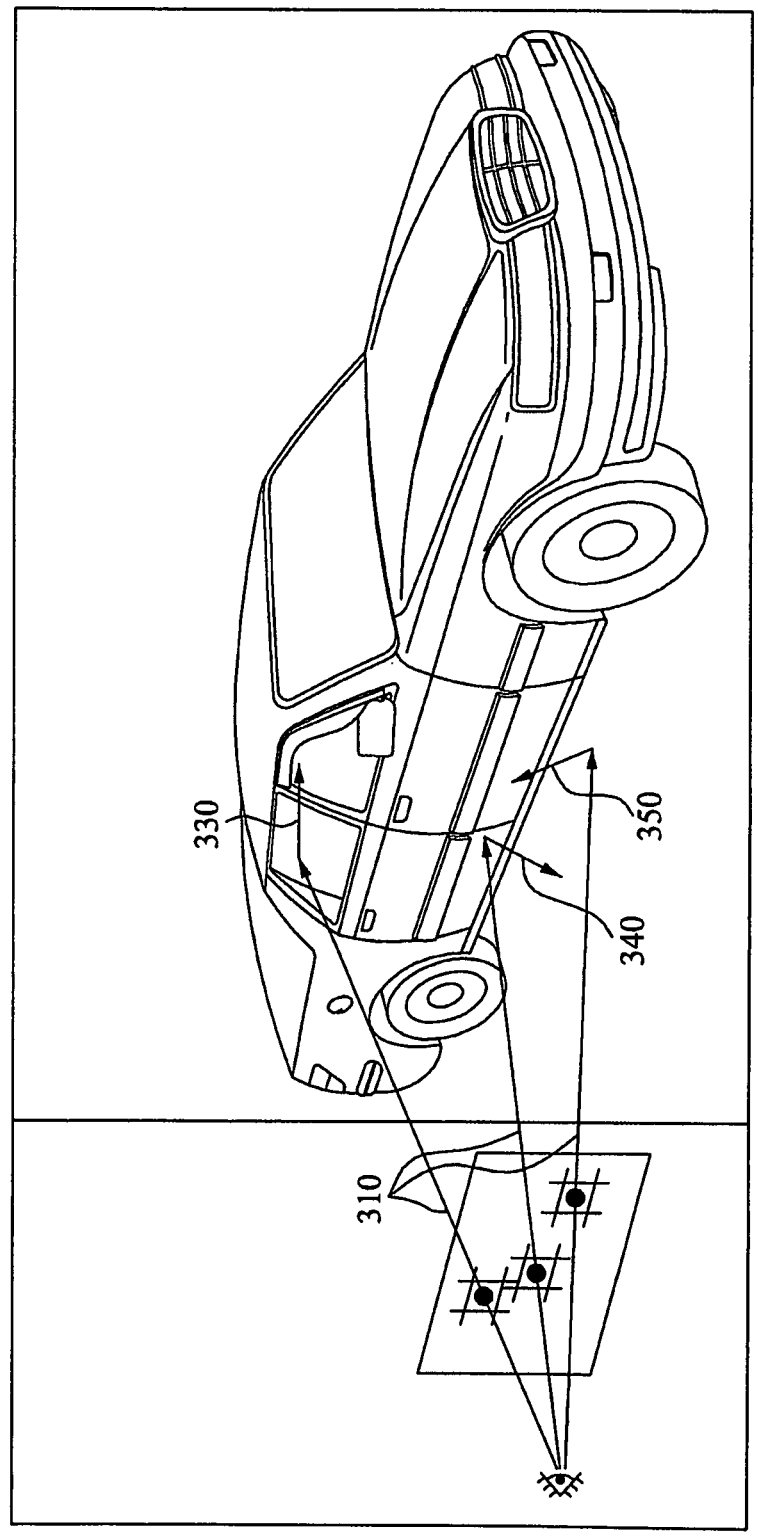
FIG. 3 illustrates a diagram of a ray tracing according to example embodiments.

FIG. 3 illustrates a diagram of an operation of ray tracing according to example embodiments.

Referring to FIG. 3, when a primary ray 310 is emitted with respect to an entire scene, secondary rays such as a reflection ray 340, a refraction ray 330, and a shadow ray 350 corresponding to the primary ray 310 may be generated. Here, the shadow ray 350 is a ray for determining whether a point on a surface of the object belongs to a shadow area, the refraction ray 330 is a ray for calculating a refracted image in a case of a surface refracting a ray, and the reflection ray 340 is a ray for calculating a reflected image in a case of a surface reflecting a ray.

In this instance, the generated secondary ray may be stored according to a type of the secondary ray. That is, the reflection ray 340, the refraction ray 330, and the shadow ray 350 may be classified and may be stored respectively.

Also, the shadow ray that is one of a secondary ray generated corresponding to a primary ray will be described in detail with reference to FIG. 4 as below.

Figure 4:
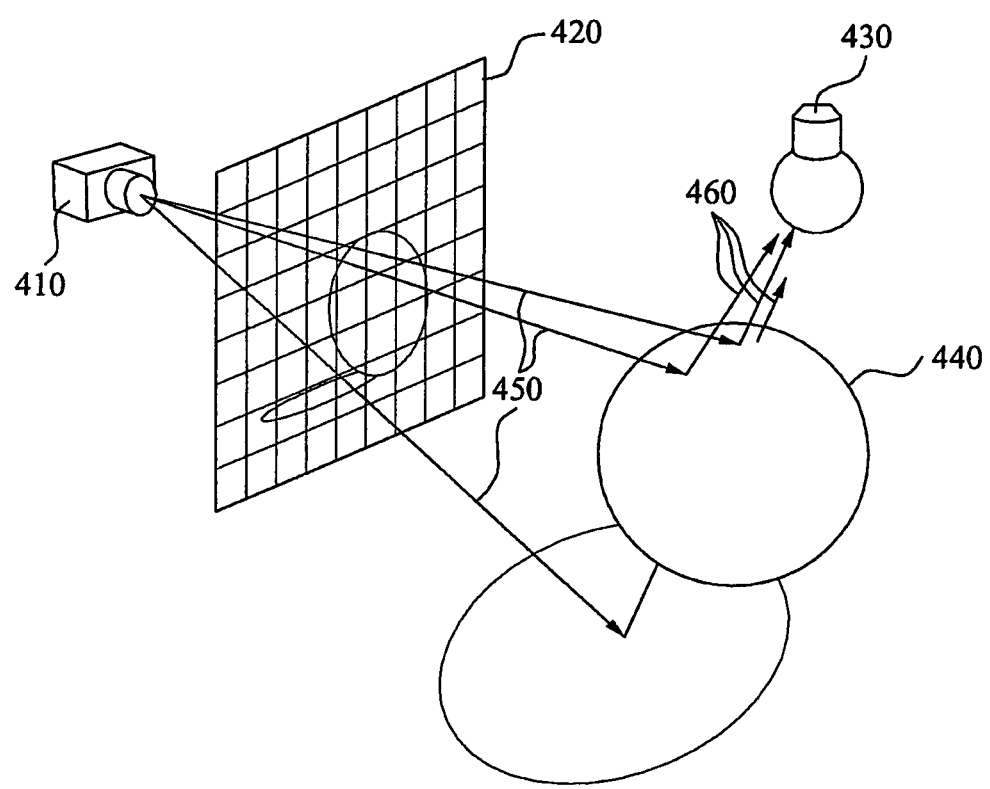
FIG. 4 illustrates a diagram of a direction of a shadow ray in a method of enhancing a ray tracing speed according to example embodiments.

Referring to FIG. 4, whether a shadow is included in a point on a surface of an object 440 at a moment of when a primary ray 450 makes contact with an object 440, the primary ray 450 being emitted to each pixel direction on a scene 420 from a camera 410, may be calculated. To determine whether a point on a surface of the object 440 belongs to a shadow area, whether another object exists between the point and a light source 430 may be determined by emitting a ray from the point to the light source 430. In this instance, shadow rays 460 have different start points but head for the same light source 430, and thus, when being inversely traced from the light source 430 to the surface, the shadow rays may have the same start points.

Referring again to FIG. 1, a secondary ray may be grouped based on a direction of the secondary ray S130. As an example, if a shadow ray, one of the secondary rays, is generated, it may be grouped based on a direction of the shadow ray.

Figure 6:
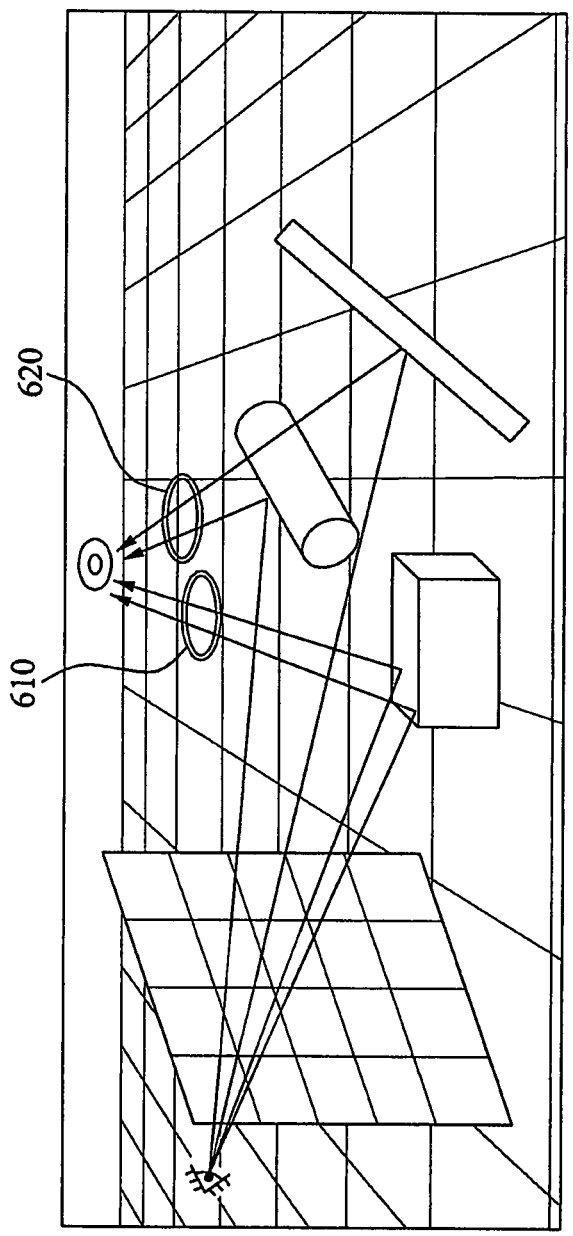
FIG. 6 illustrates a diagram of a regrouping of a shadow ray in a method of enhancing a ray tracing speed according to other example embodiments.

Referring now to FIG. 6, shadow rays having similar directions among shadow rays generated by emitting primary rays may be grouped in a single group. That is, the shadow rays may be respectively grouped into a group 610 and a group 620.

A process of grouping a secondary ray (FIG. 1, S130), will be described in detail with reference to FIG. 2 as below.

Figure 2:
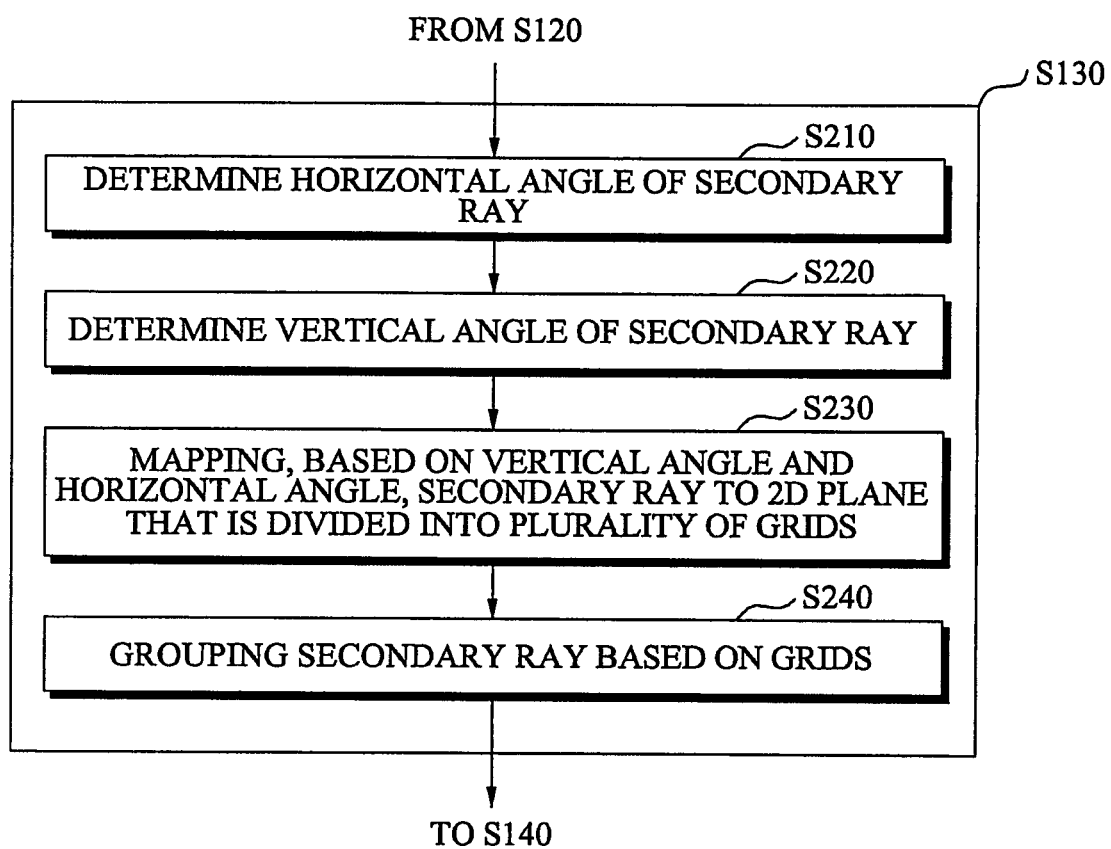
FIG. 2 illustrates a flowchart of a method of grouping a secondary ray according to example embodiments.

Referring to FIG. 2, a horizontal angle of a secondary ray may be determined in operation S210. In this instance, the horizontal angle may be an angle that rotates clockwise or counterclockwise based on an axis in a horizontal plane.

In operation S220, a vertical angle of the secondary ray may be determined. In this instance, the vertical angle may be an angle that is inclined toward a horizontal plane. Here, the vertical angle and the horizontal angle will be described with reference to FIG. 7 as below.

Figure 7:
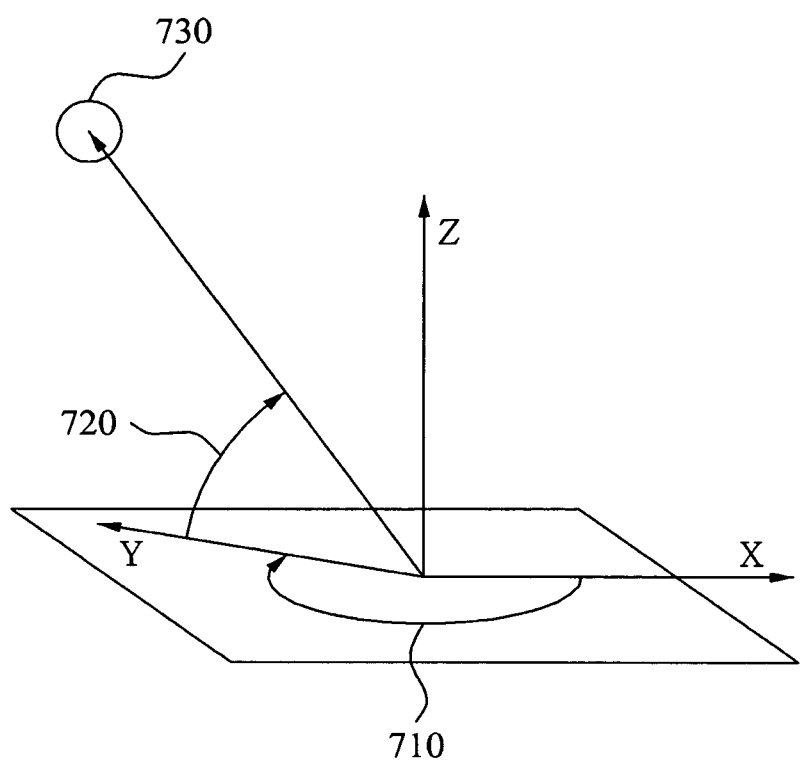
FIG. 7 illustrates a diagram of a vertical angle and a horizontal angle of a ray in a method of enhancing ray tracing speed according to other example embodiments.

Referring to FIG. 7, a direction in a 3D space may be expressed based on two angles of about 0 degrees to about 360 degrees, that is, a vertical angle 720 and a horizontal angle 710. As an example, in a case of a shadow ray that enters a light source 730, an x axis, a y axis, and a z axis being orthogonal to each other are set in the 3D space, and an angle that rotates clockwise based on an axis in an x-y plane being parallel to a ground may be determined as the horizontal angle 710. Also, an angle that rotates counterclockwise based on an axis on the x-y plane may be determined as the horizontal angle 710. Also, an angle between the x-y plane and the shadow ray may be set as the vertical angle 720.

Referring again to FIG. 2, a secondary ray may be mapped, based on a vertical angle and a horizontal angle, to a plane that is divided into a plurality of grids in operation S230.

In operation S240, the secondary ray may be grouped based on the grids. The process of mapping and grouping will be described in detail with reference to FIG. 8.

Figure 8:
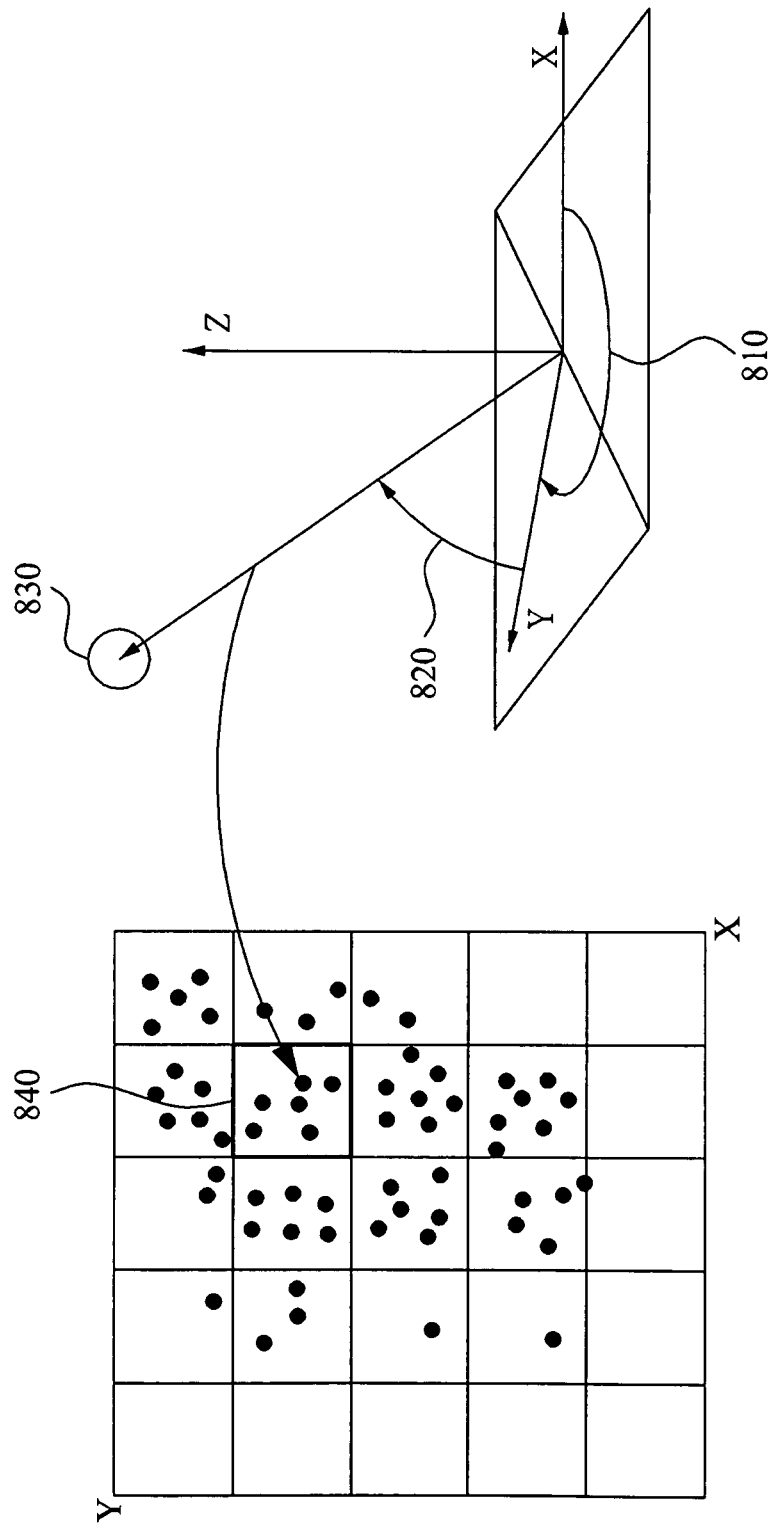
FIG. 8 illustrates a diagram of a method of mapping a secondary ray to a 2D plane based on a vertical angle and a horizontal angle in a method of enhancing a ray tracing speed according to example embodiments.

Referring to FIG. 8, all directions of secondary rays in a 3D space may be expressed based on a vertical angle 820 and a horizontal angle 810, and each of the secondary rays may be mapped, based on the vertical angle 820 and the horizontal angle 810, to a 2D plane that is divided into a plurality of grids, with grid 840 as an example. In this instance, a horizontal axis on the 2D plane is matched to the horizontal angle (or to the vertical angle) and a vertical axis is matched to the vertical angle (or to the horizontal angle), respectively, and thus, the secondary rays may be mapped on the 2D coordinates. In this instance, secondary rays included in each grid may be regarded as a single group and may be grouped, and packet tracing may be performed for each group, for example the group within grid 840. Here, when a number of rays included in a single grid is greater than or equal to a predetermined number (for example, 5), rays in the single grid are grouped, and when the number of the rays in the single grid is less than the predetermined number, the rays in the single grid are not grouped. That is, when the number of the rays is less than the predetermined number, packet tracing is not performed with respect to each secondary ray, and separate processing with respect to each secondary ray is performed.

Referring again to FIG. 1, packet tracing with respect to a secondary ray may be performed for each group. In this instance, packet tracing is performed with respect to the secondary ray having a similar direction for each group, and thus, a common portion may be processed at once. Accordingly, efficiency of the ray tracing may be improved.

As described above, the secondary ray is not packetized based on a packet of a primary ray, and the secondary ray is regrouped based on a direction of the secondary ray. Accordingly, a coherency of the regrouped secondary ray increases. Also, a common portion is processed at once, thereby increasing the efficiency of the ray tracing.

Figure 9:
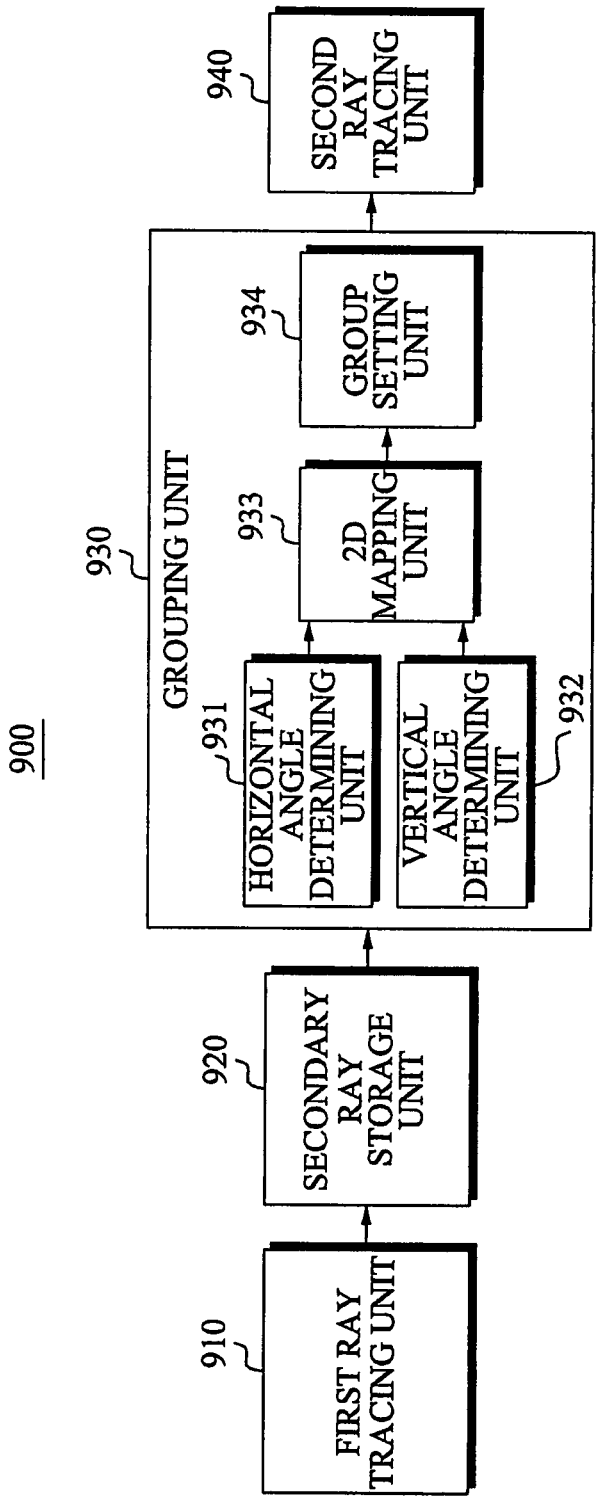
FIG. 9 illustrates a block diagram of an apparatus of enhancing a ray tracing speed according to other example embodiments.

FIG. 9 is a block diagram illustrating an apparatus of enhancing a ray tracing speed according to other example embodiments.

Referring to FIG. 9, a ray tracing speed enhancing apparatus 900 may include a first ray tracing unit 910, a secondary ray storage unit 920, a grouping unit 930, and a second ray tracing unit 940.

The first ray tracing unit 910 may perform ray tracing with respect to a primary ray. In this instance, the primary ray may be emitted with respect to an entire scene.

The secondary ray storage unit 920 may store a secondary ray generated corresponding to the ray tracing. In this instance, the secondary ray may be at least one of a shadow ray, a reflection ray, and a refraction ray. Also, when being stored, the secondary ray may be classified according to a type of the secondary ray.

The grouping unit 930 may group the secondary ray based on a direction of the secondary ray. Here, the grouping unit 930 may include a horizontal angle determining unit 931, a vertical angle determining unit 932, a 2D mapping unit 933, and a group setting unit 934.

The horizontal angle determining unit 931 may determine a horizontal angle of the secondary ray, and the vertical angle determining unit 932 may determine a vertical angle of the secondary ray. That is, the direction of the secondary ray in a 3D space may be expressed using the vertical angle and the horizontal angle.

The 2D mapping unit 933 may perform mapping, based on the vertical angle and the horizontal angle, the secondary ray to a 2D plane that is divided into a plurality of grids. That is, a horizontal axis and a vertical axis on the 2D plane are respectively matched to the horizontal angle and the vertical angle, and thus, a plurality of secondary rays are mapped to coordinates on the 2D plane.

The group setting unit 934 may perform grouping of the secondary ray based on the grids. That is, secondary rays that are mapped close to each other on the 2D plane may be determined to have similar directions. Accordingly, a plurality of secondary rays included in the same grid may be grouped into a single group, and packet tracing may be performed for each group. However, when a number of the secondary rays included in a single grid is less than a predetermined number, packet tracing may not be performed, and separate processing may be performed.

The second ray tracing unit 940 may perform packet tracing with respect to the secondary ray for each group. That is, secondary rays having similar directions are grouped into a single group and packet tracing with respect to the secondary rays are performed, and thus, a common portion is processed at once while traversal is performed.

As described above, the secondary ray is not grouped based on the primary ray, and the secondary ray is grouped based on the direction of the secondary ray, and thus, the efficiency of the ray tracing increases.

In addition to the above described embodiments, embodiments can also be implemented through computer readable code/instructions in/on a medium, e.g., a computer readable medium, to control at least one processing device to implement any above described embodiment. The medium can correspond to any medium/media permitting the storing and/or transmission of the computer readable code.

The computer readable code can be recorded on a medium in a variety of ways, with examples of recording media including magnetic storage media (e.g., ROM, floppy disks, hard disks, etc.) and optical recording media (e.g., CD-ROMs, or DVDs). The computer readable code may also be transferred through transmission media as well as elements of the Internet, for example. Thus, the medium may be such a defined and measurable structure carrying or controlling a signal or information, such as a device carrying a bitstream, for example, according to one or more embodiments. The media may also be a distributed network, so that the computer readable code is stored/transferred and executed in a distributed fashion. Still further, as only an example, the processing device could include a processor or a computer processor, and processing elements may be distributed and/or included in a single device.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A method of enhancing a ray tracing speed, the method comprising:
    performing ray tracing with respect to a primary ray;
    storing a secondary ray generated corresponding to the ray tracing, and storing a type of the secondary ray;
    mapping the secondary ray to coordinates of a two-dimensional (2D) plane, such that one of a horizontal angle of the secondary ray and a vertical angle of the secondary ray is mapped to a horizontal axis of the 2D plane, and the other of the horizontal angle and the vertical angle is mapped to a vertical axis of the 2D plane;
    grouping the secondary ray based on a direction of the secondary ray; and
    performing packet tracing with respect to the secondary ray for each group.

2. The method of claim 1, wherein the grouping of the secondary ray comprises:
    determining the horizontal angle of the secondary ray;
    determining the vertical angle of the secondary ray; and
    grouping the secondary ray based on the grids,
    wherein the 2D plane is divided into a plurality of grids and the secondary rays included in each respective grid are a single group.

3. The method of claim 2, wherein the horizontal angle is an angle that rotates clockwise around an axis of a horizontal plane.

4. The method of claim 2, wherein the horizontal angle is an angle that rotates counterclockwise around an axis of a horizontal plane.

5. The method of claim 2, wherein the vertical angle is an angle that is inclined from a horizontal plane.

6. The method of claim 2, wherein the grouping based on the grids performs grouping of rays in a single grid into a single group, when a number of the rays in the single grid is greater than or equal to a predetermined number, and does not perform the grouping of the rays in the single grid, when the number of the rays in the single grid is less than the predetermined number.

7. The method of claim 1, wherein the secondary ray is at least one of a shadow ray, a reflection ray, and a refraction ray.

8. A non-transitory computer readable recording medium storing a program for causing a computer to implement the method of claim 1.

9. An apparatus of enhancing a ray tracing, the apparatus comprising:
    a first ray tracing unit, using at least one processing device, to perform ray tracing with respect to a primary ray;

a secondary ray storage unit to store a secondary ray generated corresponding to the ray tracing, and to store a type of the secondary ray;

a 2D mapping unit to perform mapping of the secondary ray to coordinates of a two-dimensional (2D) plane, such that one of a horizontal angle of the secondary ray and a vertical angle of the secondary ray is mapped to a horizontal axis of the 2D plane, and the other of the horizontal angle and the vertical angle is mapped to a vertical axis of the 2D plane;

a grouping unit to perform grouping of the secondary ray based on a direction of the secondary ray; and a second ray tracing unit to perform a packet tracing with respect to the secondary ray for each generated group.

10. The apparatus of claim 9, wherein the grouping unit comprises:

a horizontal angle determining unit to determine a horizontal angle of the secondary ray;

a vertical angle determining unit to determine a vertical angle of the secondary ray; and a group setting unit to perform grouping of the secondary ray based on the grids, wherein the 2D plane is divided into a plurality of grids and the secondary rays included in each respective grid are a single group.

11. The apparatus of claim 10, wherein the horizontal angle is an angle that rotates clockwise around an axis of a horizontal plane.

12. The apparatus of claim 10, wherein the horizontal angle is an angle that rotates counterclockwise around an axis of a horizontal plane.

13. The apparatus of claim 10, wherein the vertical angle is an angle that is inclined from a horizontal plane.

14. The apparatus of claim 10, wherein the grouping unit performs grouping of rays in a single grid into a single group, when a number of the rays in the single grid is greater than or equal to a predetermined number, and does not perform grouping of the rays in the single grid, when the number of the rays in the single grid is less than the predetermined number.

15. The apparatus of claim 9, wherein the secondary ray is at least one of a shadow ray, a reflection ray, and a refraction ray.

16. An apparatus of enhancing an efficiency of a ray tracing, the apparatus comprising:

a first ray tracing unit, using at least one processing device, to perform ray tracing with respect to plural primary rays, at least a portion of the plural primary rays being traced at once when the portion of primary rays has a similar direction;

a secondary ray storage unit to store plural secondary rays, generated corresponding to the ray tracing, and to store a type of each of the plural secondary rays;

a grouping unit to perform regrouping of the plural secondary rays, based on a direction of the plural secondary rays;

a second ray tracing unit to perform a packet tracing on a group of plural secondary rays; and a 2D mapping unit to perform mapping of the plural secondary rays to coordinates of a 2D plane that is divided into a plurality of grids, such that one of a horizontal angle of the secondary ray and a vertical angle of the secondary ray is mapped to a horizontal axis of the 2D plane, and the other of the horizontal angle and the vertical angle is mapped to a vertical axis of the 2D plane, wherein the plural secondary rays included in each grid are a single group.

* * * * *

UNITED STATES PATENT AND TRADEMARK OFFICE
CERTIFICATE OF CORRECTION

PATENT NO. : 8,441,477 B2  Page 1 of 1
APPLICATION NO. : 12/453999
DATED : May 14, 2013
INVENTOR(S) : Young Ihn Kho et al.

It is certified that error appears in the above-identified patent and that said Letters Patent is hereby corrected as shown below:

Title Page, item [73] (Assignee), Line 1, Delete "Electronis" and insert --Electronics--, therefor.

Signed and Sealed this
Eighth Day of October, 2013

Teresa Stanek Rea
*Deputy Director of the United States Patent and Trademark Office*